US008881247B2

(12) United States Patent
Mendelovich et al.

(10) Patent No.: US 8,881,247 B2
(45) Date of Patent: Nov. 4, 2014

(54) FEDERATED MOBILE AUTHENTICATION USING A NETWORK OPERATOR INFRASTRUCTURE

(75) Inventors: Meir Mendelovich, Leziyon (IL); John Neystadt, Kfar-Saba (IL); Khaja E. Ahmed, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 12/889,412

(22) Filed: Sep. 24, 2010

(65) Prior Publication Data

US 2012/0079569 A1 Mar. 29, 2012

(51) Int. Cl.
*G06F 15/16* (2006.01)
*G06F 11/30* (2006.01)
*H04L 9/32* (2006.01)
*H04W 12/06* (2009.01)
*H04L 29/06* (2006.01)
*H04W 88/02* (2009.01)

(52) U.S. Cl.
CPC ............ *H04L 9/3213* (2013.01); *H04W 12/06* (2013.01); *H04L 63/0807* (2013.01); *H04L 2209/80* (2013.01); *H04W 88/02* (2013.01)
USPC .............................................. 726/5; 713/186

(58) Field of Classification Search
CPC ..................... H04L 63/0815; G06F 21/41
USPC .......... 713/182, 186, 168, 201; 726/2, 3, 5, 6, 726/7, 8, 10
See application file for complete search history.

(56) References Cited

U.S. PATENT DOCUMENTS

| | | | |
|---|---|---|---|
| 7,346,923 B2 * | 3/2008 | Atkins et al. | 726/6 |
| 7,370,351 B1 * | 5/2008 | Ramachandran et al. | 726/8 |
| 7,836,298 B2 * | 11/2010 | Gross et al. | 713/155 |
| 8,141,139 B2 * | 3/2012 | Hinton et al. | 726/8 |
| 8,320,549 B2 * | 11/2012 | Ramanathan et al. | 379/221.08 |
| 8,607,322 B2 * | 12/2013 | Hinton et al. | 726/10 |

(Continued)

FOREIGN PATENT DOCUMENTS

| | | |
|---|---|---|
| WO | 2004100487 A1 | 11/2004 |
| WO | 2010000298 A1 | 1/2010 |
| WO | WO-2010000298 * | 1/2010 |
| WO | 2010035949 A2 | 4/2010 |

OTHER PUBLICATIONS

Djordjevic et al, A note on the anatomy of fedeation, Oct. 2005, BT technology Journal, p. 89-106.*

(Continued)

*Primary Examiner* — Abu Sholeman
(74) *Attorney, Agent, or Firm* — Henry Gabryjelski; Sade Fashokun; Micky Minhas

(57) ABSTRACT

Architecture that utilizes the strong authentication mechanisms of network operators to provide authentication to mobile applications by identity federation. When a mobile client initiates request for access to an application outside the network operation infrastructure, the request is passed to an associated application secure token service. The application secure token service has an established trust and identity federation with the network operator. The application secure token service redirects the request to a network operator security token server, which then passes the request to a network operator authentication server for authentication against an operator identity service. Proof of authentication is then issued and returned from the network operator security token server to the application secure token service and the application, which allows the mobile client to access the application.

18 Claims, 7 Drawing Sheets

(56) References Cited

U.S. PATENT DOCUMENTS

| | | | |
|---|---|---|---|
| 8,613,058 B2* | 12/2013 | Beyer et al. | 726/5 |
| 8,707,409 B2* | 4/2014 | Shah et al. | 726/8 |
| 2003/0163733 A1 | 8/2003 | Barriga-Caceres et al. | |
| 2003/0237002 A1* | 12/2003 | Oishi et al. | 713/201 |
| 2004/0230831 A1* | 11/2004 | Spelman et al. | 713/201 |
| 2005/0039054 A1* | 2/2005 | Satoh et al. | 713/201 |
| 2005/0114701 A1* | 5/2005 | Atkins et al. | 713/201 |
| 2005/0278547 A1* | 12/2005 | Hyndman et al. | 713/185 |
| 2006/0021019 A1* | 1/2006 | Hinton et al. | 726/10 |
| 2006/0080352 A1* | 4/2006 | Boubez et al. | 707/102 |
| 2006/0147043 A1* | 7/2006 | Mann et al. | 380/270 |
| 2006/0218396 A1* | 9/2006 | Laitinen et al. | 713/167 |
| 2006/0276196 A1* | 12/2006 | Jiang et al. | 455/446 |
| 2007/0073889 A1* | 3/2007 | Morris | 709/229 |
| 2007/0079136 A1* | 4/2007 | Vishik et al. | 713/186 |
| 2007/0143829 A1 | 6/2007 | Hinton et al. | |
| 2007/0186106 A1* | 8/2007 | Ting et al. | 713/168 |
| 2007/0293216 A1* | 12/2007 | Jiang | 455/433 |
| 2008/0059575 A1* | 3/2008 | Malobrodsky et al. | 709/203 |
| 2008/0263629 A1 | 10/2008 | Anderson | |
| 2009/0043891 A1* | 2/2009 | Woo et al. | 709/225 |
| 2009/0178132 A1* | 7/2009 | Hudis et al. | 726/12 |
| 2009/0187974 A1* | 7/2009 | Tulshibagwale et al. | 726/4 |
| 2009/0265554 A1* | 10/2009 | Robles et al. | 713/168 |
| 2009/0265753 A1* | 10/2009 | Anderson et al. | 726/1 |
| 2009/0271621 A1 | 10/2009 | Mendelovich et al. | |
| 2009/0293108 A1* | 11/2009 | Weeden | 726/6 |
| 2009/0320116 A1* | 12/2009 | Guo et al. | 726/9 |
| 2009/0328178 A1 | 12/2009 | McDaniel et al. | |
| 2010/0100924 A1* | 4/2010 | Hinton | 726/1 |
| 2010/0115598 A1 | 5/2010 | Barriga et al. | |
| 2010/0146290 A1* | 6/2010 | Bachmann et al. | 713/185 |
| 2010/0205662 A1* | 8/2010 | Ibrahim et al. | 726/7 |
| 2010/0322402 A1* | 12/2010 | Ramanathan et al. | 379/211.01 |
| 2011/0179475 A1* | 7/2011 | Foell et al. | 726/6 |
| 2011/0202986 A1* | 8/2011 | Horn et al. | 726/7 |
| 2011/0209202 A1* | 8/2011 | Otranen | 726/4 |
| 2012/0011578 A1* | 1/2012 | Hinton et al. | 726/8 |
| 2012/0023568 A1* | 1/2012 | Cha et al. | 726/10 |
| 2012/0054120 A1* | 3/2012 | Hjelm et al. | 705/347 |
| 2012/0066497 A1* | 3/2012 | Kumar et al. | 713/168 |
| 2012/0066502 A1* | 3/2012 | Borneman et al. | 713/176 |
| 2012/0204231 A1* | 8/2012 | Holtmanns et al. | 726/3 |
| 2012/0209934 A1* | 8/2012 | Smedman | 709/208 |
| 2012/0278457 A1* | 11/2012 | Yasrebi et al. | 709/221 |
| 2012/0324541 A1* | 12/2012 | Palacios Valverde | 726/4 |
| 2013/0007858 A1* | 1/2013 | Shah et al. | 726/6 |
| 2013/0086669 A1* | 4/2013 | Sondhi et al. | 726/8 |
| 2013/0222839 A1* | 8/2013 | Armstrong | 358/1.14 |
| 2014/0066014 A1* | 3/2014 | Nicholson et al. | 455/411 |

OTHER PUBLICATIONS

Beek et al, Towards security analysis of an idenity Federation protocl for web services in convergent networks, 2007 IEEE, p. 1-6.*

Siddiqi, et al., "Federated Global Identity Management: Towards a Framework", The 2006 International Conference on Grid Computing & Applications (retrieved at http://citeseerx.ist.psu.edu/viewdoc/download?doi=10.1.1.86.6466&rep=rep1&type=pdf).

Beek, et al., "Towards Security Analyses of an Identity Federation Protocol for Web Services in Convergent Networks", Proceedings of the the Third Advanced International Conference on Telecommunications, May 13-19, 2007 (retrieved at http://ieeexplore.ieee.org/stamp/stamp.jsp?tp=&arnumber=4215252).

Tran, et al., "Identity Federation in a Multi Circle-of-Trust Constellation", Telektronikk 3/4 2007 (retrieved at http://www.telenor.com/en/resources/images/103-118_IdentityFederation_tcm28-36819.pdf).

* cited by examiner ns of network operators to provide applications strong authentication. This is accomplished using identity federation between the network operator and the applications, as premised on an established trust between an operator and an application vendor.

FEDERATED MOBILE AUTHENTICATION USING A NETWORK OPERATOR INFRASTRUCTURE

BACKGROUND

Mobile applications lack a strong authentication mechanism to authenticate users. Methods commonly used on a computing platform (e.g., desktop) include smartcards and TPM (trusted platform module) technology, neither of which exist on mobile devices. Other mechanisms such as a client certificate are difficult to deploy while methods such as one-time-password (OTP) are applicable on mobile devices, but are complicated and cumbersome to the user experience. Meanwhile, network operators usually have strong authentication mechanisms available such as the cellular SIM (subscriber identity module) asymmetric authentication.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a technique that utilizes the strong authentication mechanisms of network operators to provide strong authentication to mobile applications by using identity federation. Mobile applications use the federated identity to provide improved secure service to users.

When a mobile client initiates a request for access to an application outside the network operator infrastructure, the application in turn redirects the client request to an associated application secure token service. Optionally, the application can perform some checks to determine the network operator associated with the origin of the request. The vendor of the application secure token service has an established trust and identity federation with the network operator. Accordingly, based on this trust and federation, the application secure token service redirects the client to a network operator identity security token server of the network operator. The operator security token server handles the request by processing the request against a network operator identity service for identification of the mobile device, and mapping it to subscriber identity, from network operator authentication infrastructure. A proof of authentication is then issued and returned from the network operator identity service to the mobile client, which presents the proof to the application. The application then acts on the proof of authentication in some way to allow the mobile client access the application. Hence, users are provided a smooth and integrated user experience, and mobile operators benefit by increased value to customers.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
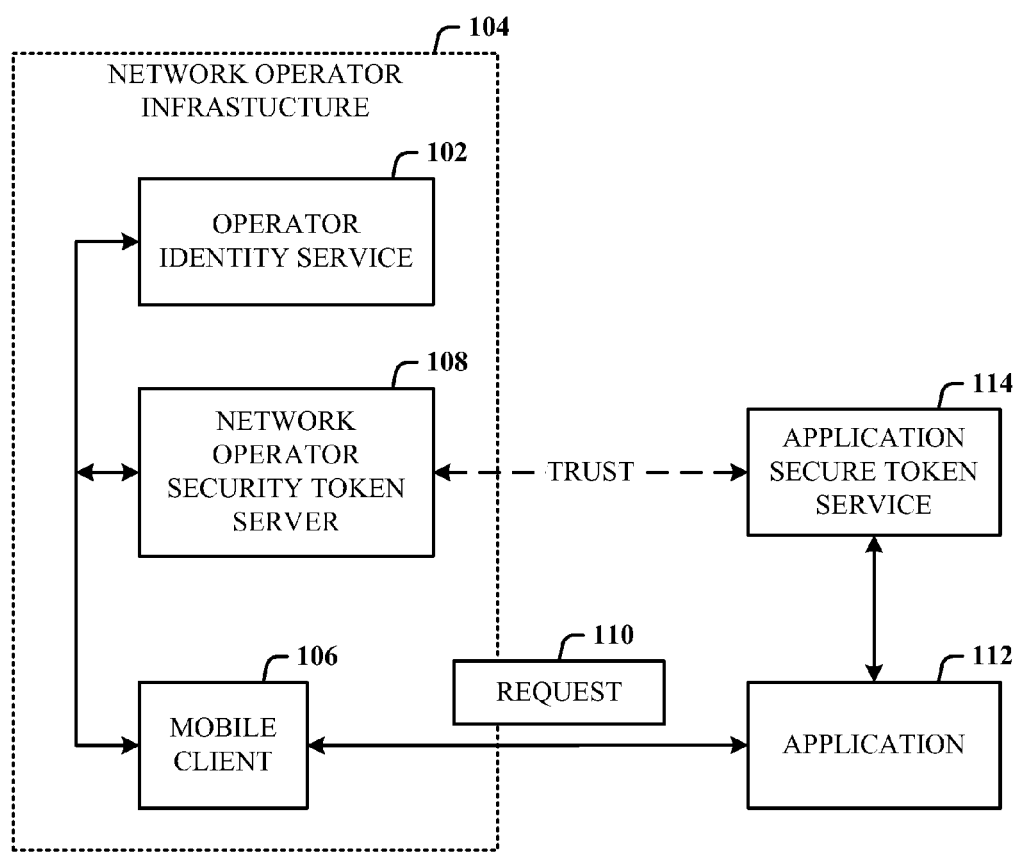
FIG. 1 illustrates a computer-implemented security system in accordance with the disclosed architecture.

The disclosed architecture utilizes the strong authentication mechanisms of network operators to provide applications strong authentication. This is accomplished using identity federation between the network operator and the applications, as premised on an established trust between an operator and an application vendor.

This architecture premises the following: the network operator provides connectivity to various mobile entities (e.g., cellular carrier, Internet Service Provider); the mobile client includes a user agent that is connected via the network operator; and, an operator security token server implemented as part of the network operator infrastructure that serves the network operator and has access to an operator identity service (e.g., authentication server) in that operator network. The network operator security token server can work side-by-side with other network operator servers (e.g., a SAML (security assertion markup language) STS (secure token service) server). The network operator identity service is used to authenticate users before the users are connected to the operator network. The identity service may be on the same machine as the token server or exist side-by-side (e.g., VLR (visitor location register)/HLR (home location register) in GSM (global system for mobile communications) networks. The application can belong to an application provider and have some federated trust with the network operator.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented security system 100 in accordance with the disclosed architecture. The system 100 includes an operator identity service 102 (included as part of an authentication component) of a network operator infrastructure 104 that authenticates a mobile client 106 to the network operator infrastructure 104 based on a mobile identity and issues proof of identification (e.g., authentication). The system 100 also includes a network operator security token server 108 of the network operator infrastructure 104 that communicates with the operator identity service 102 to obtain the proof of authentication in response to a request 110 by the mobile client 106 for access to an application 112. The network operator infrastructure 104 has an established trust and is federating identity with the application 112.

The request 110 includes network source information that compares to a range of network addresses (e.g., IP) associated with the network operator infrastructure 104. The request 110 may be checked for inclusion of a predefined token that identifies the network operator infrastructure 104.

The application 112 redirects the mobile device to an application secure token service 114, and the application secure token service 114 then redirects the mobile device 106 to the network operator security token server 108. The network operator security token server 108 sends the request 110 to the operator identity service 102 and returns the proof of authentication to the application secure token service 114 associated with the application 112.

The network operator infrastructure 104 can be a GSM (global system for mobile communications) mobile communications network and authentication can be accomplished using an XML-based standard such as SAML or other mobile or identity federation methods. The network operator security token server 108 is federating identity with the application secure token service 114 associated with the application 112. Thus, since trust is provided by the operator infrastructure 104, trust is further provided by the application 112 to the client 106.

More specifically, in one embodiment, initially, the application 112 (note that no application server is required) receives the request 110 from the mobile client 106, and optionally checks if the request 110 is coming from a range of IP addresses that is associated with the network operator infrastructure 104 or if the request 110 includes a predefined token that identifies the network operator infrastructure 104 (e.g., the network operator infrastructure 104 inserts an HTTP (hypertext transfer protocol) header into all the client requests). The application 112 redirects the client 106 to the associated application secure token service 114, which then redirects the client 106 to the network operator security token server 108.

The network operator security token server 108 handles the request, and according to the agreement with the application vendor (of the application 112), redirects back the request with a proof of authentication (e.g., a signed SAML token). The network operator security token server 108 may also prompt the user to allow the federation of different identities, such as private and enterprise. This can be made purely discretionary (opt-in or opt-out) by the user. The need for additional identity information may be required to adhere to a regulatory requirement. The application 112 receives the new request and acts upon the authentication information to either allow the client 106 access or deny client access.

In a standard GSM network, the operator identity database 102 can be the HLR, and can possibly interconnect to a VLR, which is used for visiting phones, roaming from another network. The network operator security token server 108 can be a federation proxy that has a private protocol with the HLR. The application 112 can utilize a federation proxy so the company that provides multiple applications will not have to establish trust to each application separately. Semantics can be implemented using SAML tokens, which can be limited to authentication or provide additional identity information on the user depending on the agreement between the parties (e.g., if the client is a pre-paid or post-paid subscriber, or its location).

Figure 2:
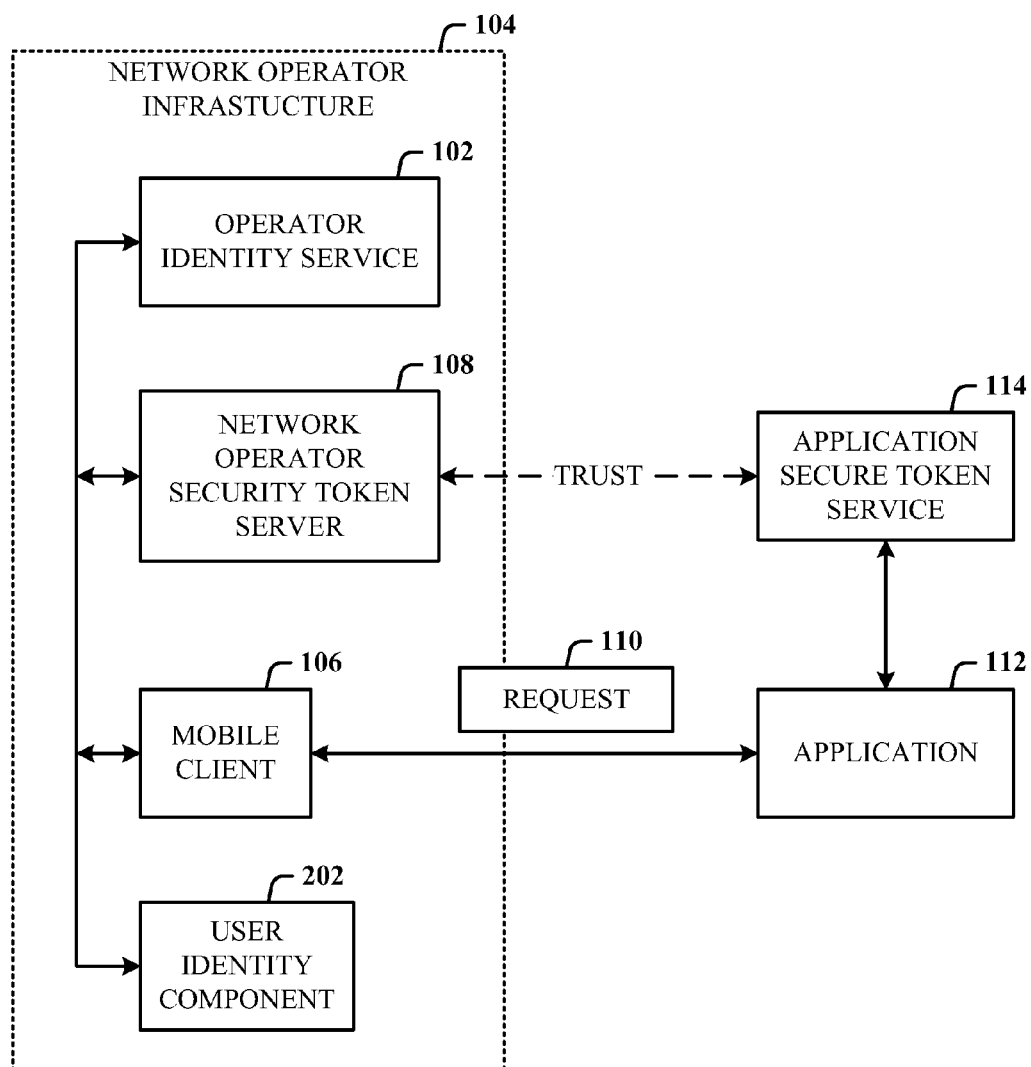
FIG. 2 illustrates a security system that allows user opt-in or opt-out for basic and additional user identity information in the identity federation.

FIG. 2 illustrates a security system 200 that allows user opt-in or opt-out for basic and additional user identity information in the identity federation. The system 200 includes a user identity component 202 that enables a user (subscriber) to choose (opt-in) to allow basic and additional user identity information (e.g., location) to be utilized for the identity federation. In order to provide the user with control over which applications to provide its identity to, the operator security token server may request consent from mobile client, which can in turn request the user permission) before giving it the identity token. The opt-in can be persisted by either security token server 108 (in order not to request it for every application) or by mobile client 106.

Thus, the subscriber can opt-in and opt-out of personal information that may have been obtained at signup and utilized thereafter. The subscriber can be provided with notice of the collection of personal information, for example, and the opportunity to provide or deny consent to do so. Consent can take several forms. Opt-in consent imposes on the subscriber to take an affirmative action before the data is collected. Alternatively, opt-out consent imposes on the subscriber to take an affirmative action to prevent the collection of data before that data is collected. This is similar to implied consent in that by doing nothing, the subscriber allows the data collection after having been informed.

The user identity security component 202 can also allow the subscriber to access and update profile information. For example, the subscriber can view the personal and/or tracking data that has been collected, and provide corrections. Vendor access to such personal or sensitive information can be restricted using the user identity component 202 for access only to authorized viewers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
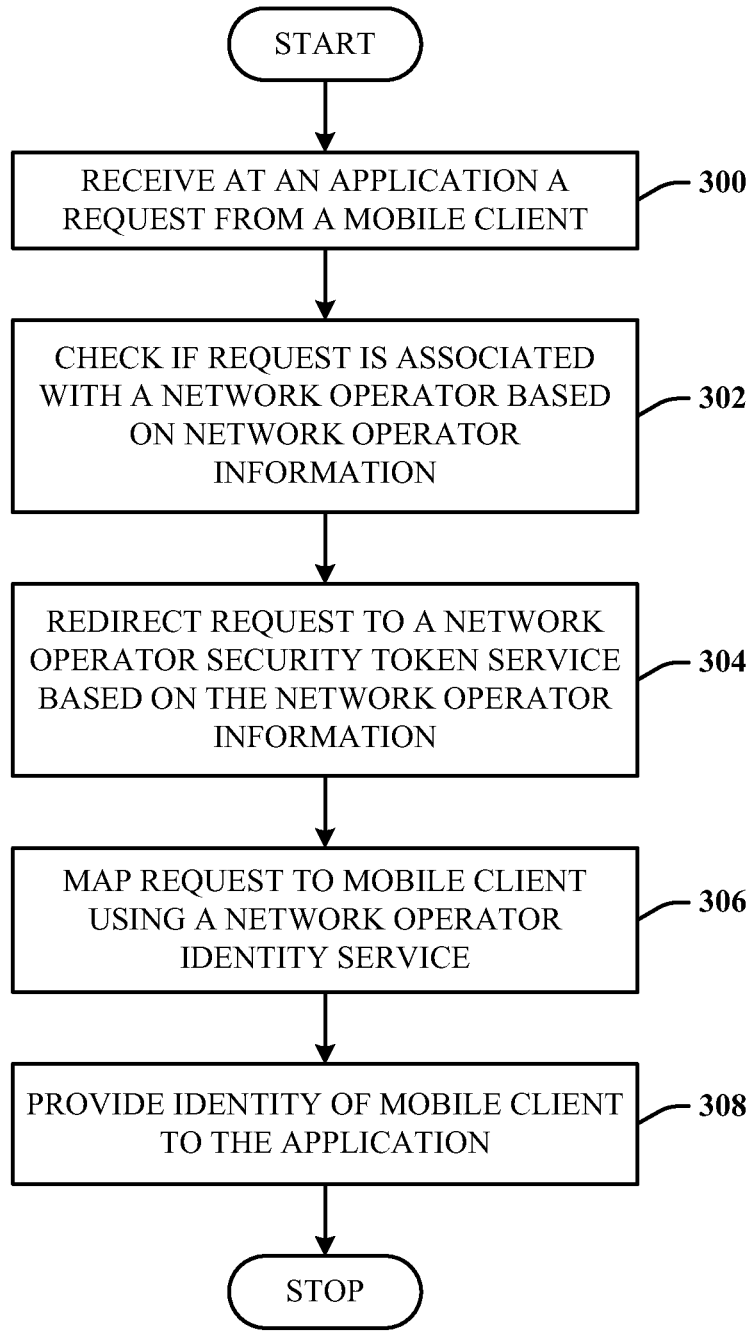
FIG. 3 illustrates a computer-implemented security method in accordance with the disclosed architecture.

FIG. 3 illustrates a computer-implemented security method in accordance with the disclosed architecture. At 300, at an application, a request is received from a mobile client. At 302, the request is optionally checked for association with a network operator based on network operator information. At 304, the request is redirected to a network operator security token service based on the network operator information. At 306, the request is mapped to the mobile client using a network operator subscriber identity service. At 308, identity of the mobile client is provided to the application.

Figure 4:
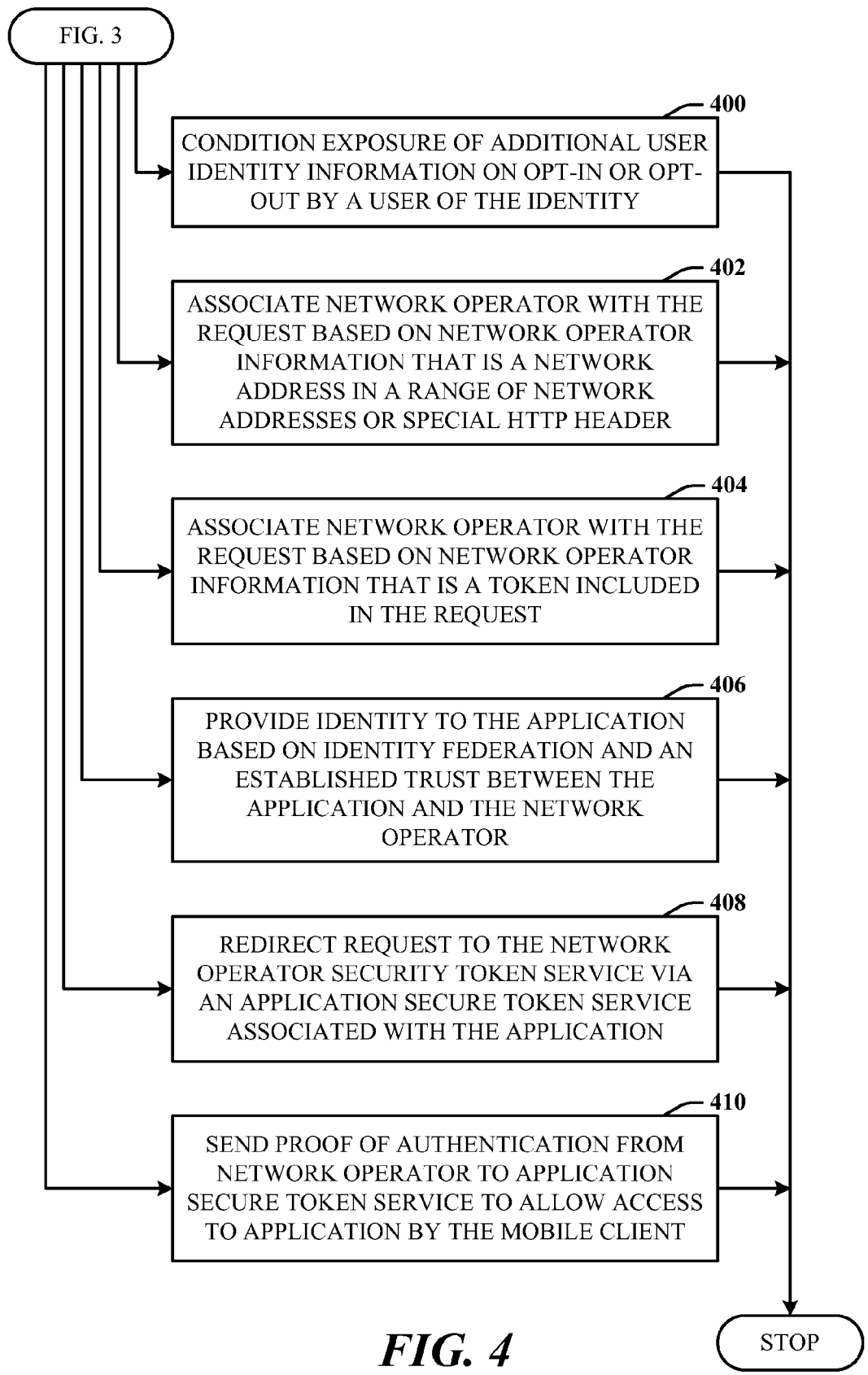
FIG. 4 illustrates further aspects of the method of FIG. 3.

FIG. 4 illustrates further aspects of the method of FIG. 3. Note that the arrowing indicates that each block represents a step that can be included, separately or in combination with other blocks, as additional aspects of the method represented by the flow chart of FIG. 3. At 400, exposure of additional user identity information is conditioned on opt-in or opt-out by a user of the identity. At 402, the network operator is associated with the request based on network operator information that is a network address in a range of network addresses or special HTTP header. At 404, the network operator is associated with the request based on network operator information that is a token included in the request. At 406, the identity is provided to the application based on identity federation and an established trust between the application and the network operator. At 408, the request is redirected to the network operator security token service via an application secure token service associated with the application. At 410, proof of authentication is sent from the network operator to an application secure token service to allow access to the application by the mobile client.

Figure 5:
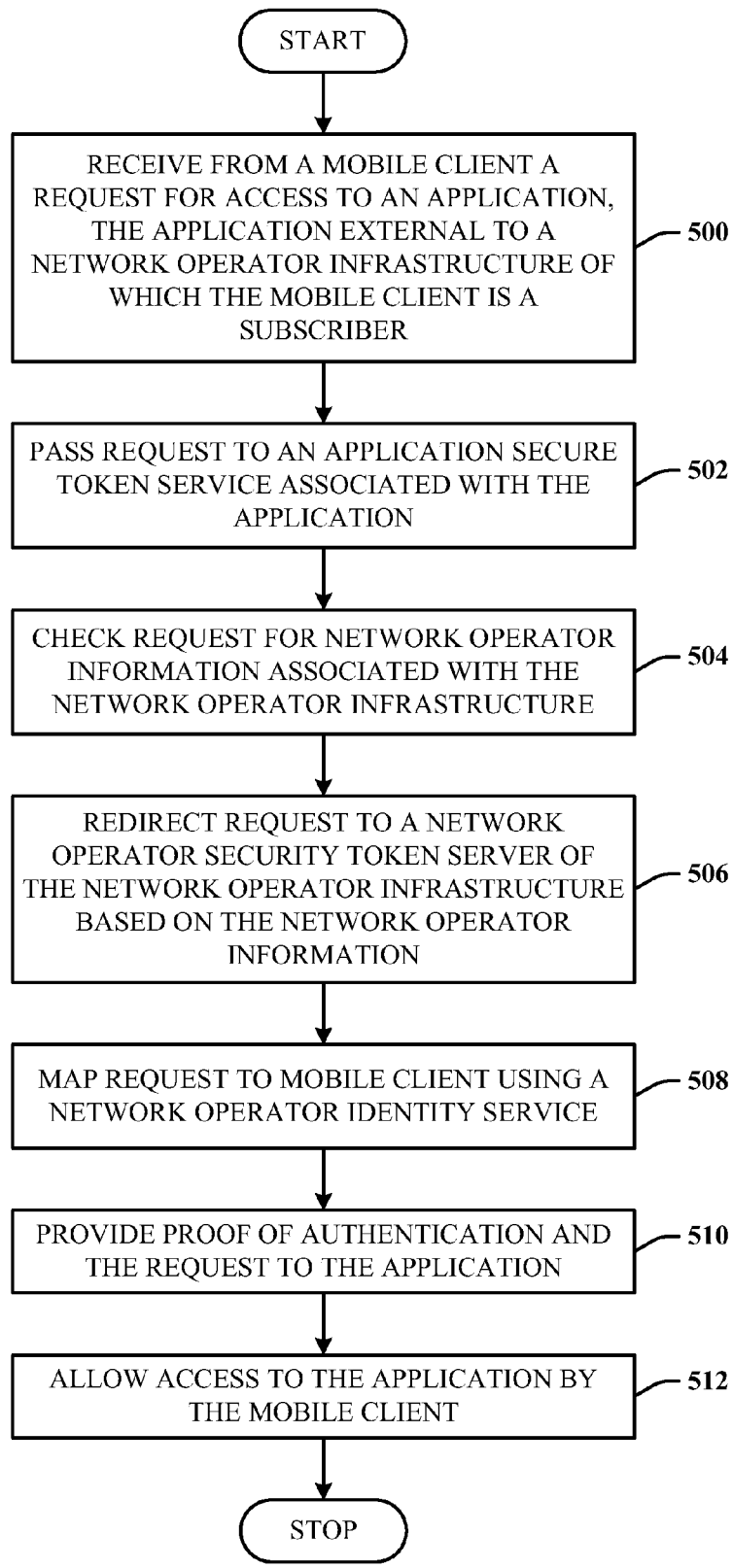
FIG. 5 illustrates an alternative security method.

FIG. 5 illustrates an alternative security method. At 500, a request for access to an application is received from a mobile client. The application is external to a network operator infrastructure of which the mobile client is a subscriber. At 502, the request is passed to an application secure token service associated with the application. At 504, the request is checked for network operator information associated with the network operator infrastructure. At 506, the request is redirected to a network operator security token server of the network operator infrastructure based on the network operator information. At 508, the request is mapped to the mobile client using a network operator identity service. At 510, proof of authentication and the request is provided to the application. At 512, access to the application by the mobile client is allowed.

Figure 6:
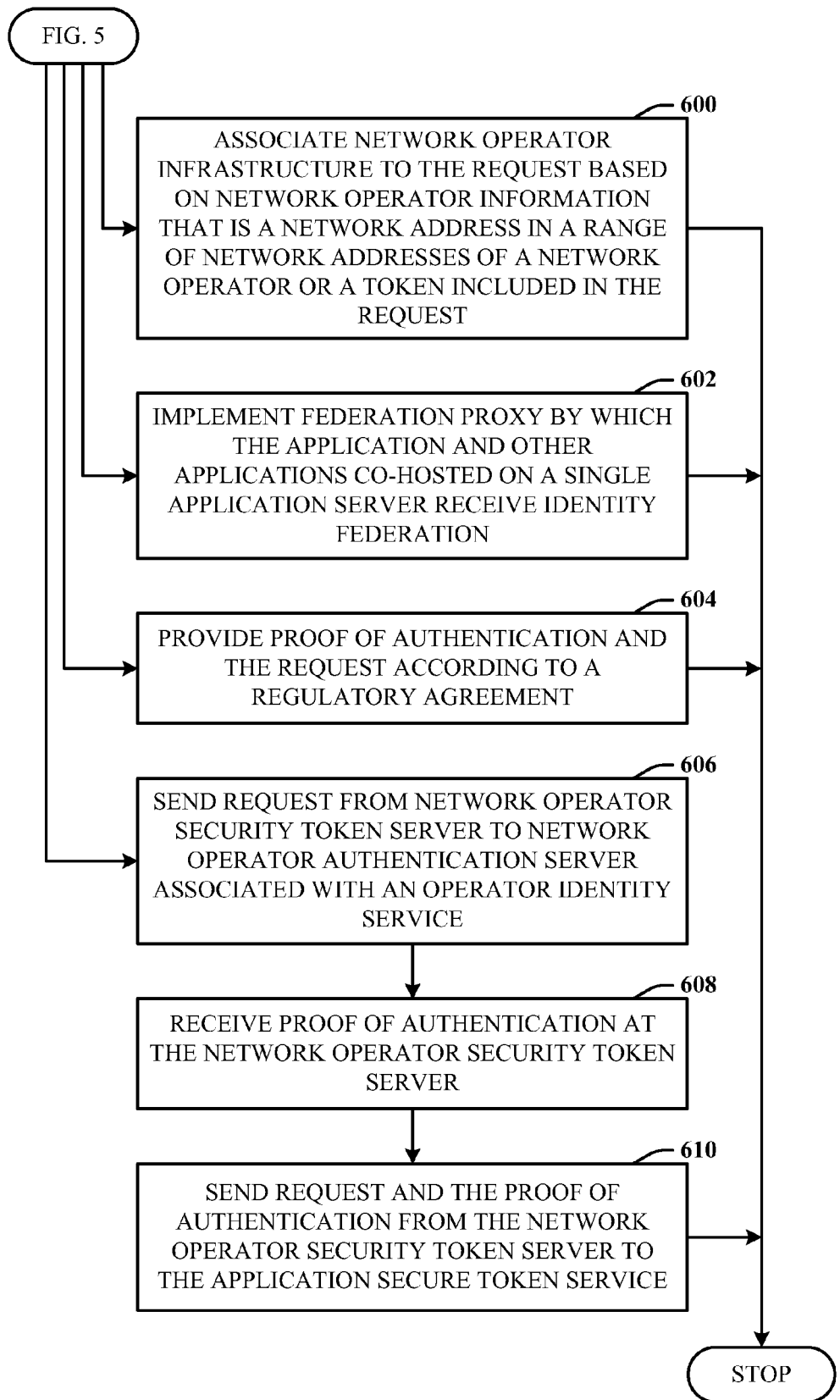
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, the network operator infrastructure is associated to the request based on network operator information that is a network address in a range of network addresses of a network operator or a token included in the request. At 602, a federation proxy is implemented by which the application and other applications co-hosted on a single application server receive identity federation. At 604, the proof of authentication and the request is provided according to a regulatory agreement. At 606, the request is sent from the network operator security token server to the network operator authentication server. At 608, the proof of authentication is received at the network operator security token server. At 610, the request and the proof of authentication are sent from the network operator security token server to the application secure token service.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
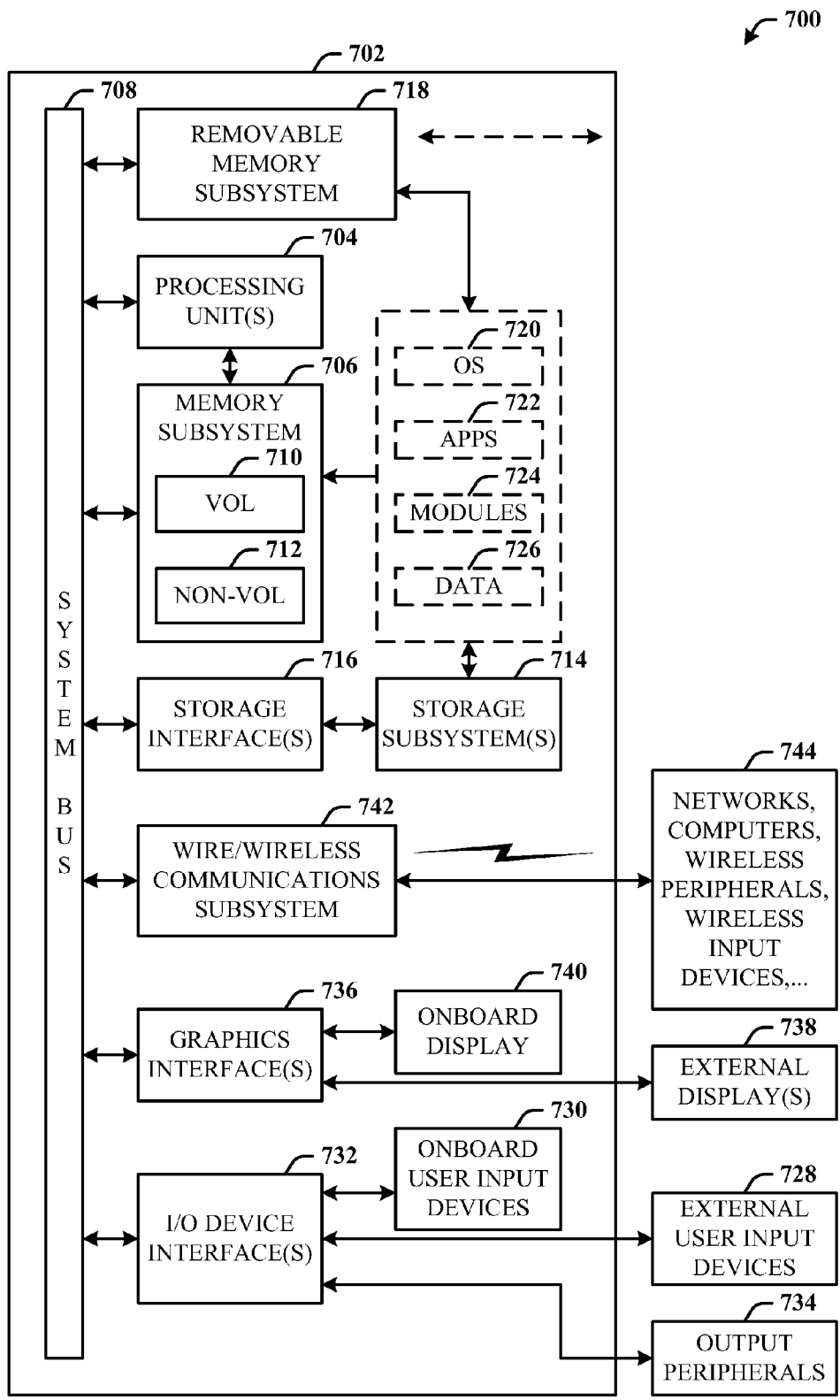
FIG. 7 illustrates a block diagram of a computing system that executes identity federation in a mobile network operator in accordance with the disclosed architecture.

Referring now to FIG. 7, there is illustrated a block diagram of a computing system 700 that executes identity federation in a mobile network operator in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The computer 702 can be employed for the network operator security token server, for example, the application secure token service, and so on. The one or more application programs 722, other program modules 724, and program data 726 can include the entities and components of the system 100 of FIG. 1, the entities and components of the system 200 of FIG. 2, and the methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented security method, the method comprising acts of:
receiving by an application a request from a mobile client that is a subscriber of a network operator infrastructure, the application is external to the network operator infrastructure;
checking that the request is associated with a network operator based on network operator information that includes a range of network addresses;
redirecting the request to a network operator security token service of the network operator infrastructure that has an identity federation and an established trust with the application based on the network operator information;
mapping the request to a subscriber identity for the mobile client using a network operator identity service of the network operator infrastructure;
providing proof of authentication and the request from the network operator identity service to the mobile client, which presents the proof to the application;
providing the subscriber identity of the mobile client to the application;
allowing access to the application by the mobile client; and configuring at least one processor to perform the acts of receiving, checking, redirecting, mapping, and providing.

2. The method of claim 1, further comprising conditioning exposure of basic and additional user identity information on opt-in or opt-out by a user of the identity.

3. The method of claim 1, further comprising associating the network operator with the request based on network operator information that is a network address in the range of network addresses.

4. The method of claim 1, further comprising associating the network operator with the request based on network operator information that is a token included in the request.

5. The method of claim 1, further comprising providing the identity to the application based on the identity federation and the established trust between the application and the network operator.

6. The method of claim 1, further comprising redirecting the request to the network operator security token service via an application secure token service associated with the application.

7. The method of claim 1, further comprising sending proof of authentication from the network operator to an application secure token service to allow access to the application by the mobile client.

8. A computer-implemented security method, the method comprising acts of:
receiving from a mobile client a request for access to an application, the application external to a network operator infrastructure of which the mobile client is a subscriber;
passing the request to an application secure token service associated with the application that has an established trust and identity federation between the application and the network operator infrastructure;
checking the request for network operator information associated with the network operator infrastructure, which network operator information includes a range of network addresses;
redirecting the request to a network operator security token server of the network operator infrastructure based on the network operator information;
mapping the request to a subscriber identity of the mobile client from the network operator infrastructure using a network operator identity service;
providing proof of authentication and the request from the network operator identity service to the mobile client, which presents the proof to the application;
allowing access to the application by the mobile client; and
configuring at least one processor to perform the acts of receiving, passing, checking, redirecting, mapping, providing, and allowing.

9. The method of claim 8, further comprising associating the network operator infrastructure to the request based on network operator information that is a network address in the range of network addresses of a network operator or a token included in the request.

10. The method of claim 8, further comprising implementing a federation proxy by which the application and other applications co-hosted on a single application server receive identity federation.

11. The method of claim 8, further comprising providing the proof of authentication and the request according to a regulatory agreement.

12. The method of claim 8, further comprising:
sending the request from the network operator security token server to a network operator authentication server associated with an operator identity service;
receiving the proof of authentication at the network operator security token server; and
sending the request and the proof of authentication from the network operator security token server to the application secure token service.

13. A computer-readable storage medium device comprising instructions that when executed by a processor, cause the processor to perform acts of:
receiving from a mobile client a request for access to an application, the application external to a network operator infrastructure of which the mobile client is a subscriber;
passing the request to an application secure token service associated with the application that has an established trust and identity federation between the application and the network operator infrastructure;
checking the request for network operator information associated with the network operator infrastructure, which network operator information includes a range of network addresses;
redirecting the request to a network operator security token server of the network operator infrastructure based on the network operator information;
mapping the request to a subscriber identity of the mobile client from the network operator infrastructure using a network operator identity service;
providing proof of authentication and the request from the network operator identity service to the mobile client, which presents the proof to the application;
allowing access to the application by the mobile client; and
configuring at least one processor to perform the acts of receiving, passing, checking, redirecting, mapping, providing, and allowing.

14. The computer-readable storage medium device of claim 13, further comprising associating the network operator infrastructure to the request based on network operator information that is a network address in the range of network addresses of a network operator or a token included in the request.

15. The computer-readable storage medium device of claim 14, further comprising implementing a federation proxy by which the application and other applications co-hosted on a single application server receive identity federation.

16. The computer-readable storage medium device of claim 14, further comprising providing the proof of authentication and the request according to a regulatory agreement.

17. The computer-readable storage medium device of claim 14, further comprising:
sending the request from the network operator security token server to a network operator authentication server associated with an operator identity service;
receiving the proof of authentication at the network operator security token server; and
sending the request and the proof of authentication from the network operator security token server to the application secure token service.

18. The computer-readable storage medium device of claim 14, wherein the proof of authentication and the request are provided according to a regulatory agreement.

* * * * *